US007963231B2

(12) United States Patent
Osborne et al.

(10) Patent No.: US 7,963,231 B2
(45) Date of Patent: Jun. 21, 2011

(54) FOLDING TABLE AND SUPPORT FRAME ASSEMBLY

(75) Inventors: Chris Osborne, Efland, NC (US); Michael Tsay, Irvine, CA (US)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/137,110

(22) Filed: Jun. 11, 2008

(65) Prior Publication Data

US 2009/0078169 A1    Mar. 26, 2009

Related U.S. Application Data

(63) Continuation-in-part of application No. 29/295,082, filed on Sep. 21, 2007, now Pat. No. Des. 575,546.

(51) Int. Cl.
A47B 3/00 (2006.01)

(52) U.S. Cl. .............. 108/40; 108/42; 108/44

(58) Field of Classification Search ............ 108/40, 108/34, 33, 45, 44, 152, 46, 47, 48, 49, 38, 108/41, 35; 297/145, 146, 147, 45
See application file for complete search history.

(56) References Cited

U.S. PATENT DOCUMENTS

| | | | |
|---|---|---|---|
| D52,678 S | 11/1918 | Scheibe | |
| 1,503,690 A * | 8/1924 | Kroschel | 108/42 |
| 1,805,737 A * | 5/1931 | Laursen | 108/40 |
| 1,809,866 A * | 6/1931 | Riesche | 108/44 |
| D162,228 S | 2/1951 | Russell | |
| 3,583,760 A * | 6/1971 | McGregor | 297/145 |
| 4,159,071 A * | 6/1979 | Roca | 108/42 |
| 4,829,910 A * | 5/1989 | Lirette | 108/35 |
| 5,443,018 A * | 8/1995 | Cromwell | 108/44 |
| D380,190 S | 6/1997 | Slayter | |
| D419,521 S | 1/2000 | Leschke et al. | |
| 6,050,200 A | 4/2000 | Sullins et al. | |
| D427,201 S | 6/2000 | Lin | |
| D437,857 S | 2/2001 | Cooper et al. | |
| D456,416 S | 4/2002 | Tonizzo | |
| 6,761,398 B2 * | 7/2004 | Bentley et al. | 297/146 |
| D499,574 S | 12/2004 | Spicer | |
| D510,359 S | 10/2005 | Gillis | |
| D512,245 S | 12/2005 | Bean et al. | |
| 7,306,282 B2 * | 12/2007 | Salzer et al. | 297/146 |
| D575,546 S | 8/2008 | Tsay et al. | |
| 7,721,657 B2 * | 5/2010 | Carstensen | 108/42 |
| 2003/0188672 A1 * | 10/2003 | Parent et al. | 108/134 |
| 2007/0227407 A1 * | 10/2007 | Cartensen | 108/33 |

* cited by examiner

*Primary Examiner* — José V Chen
(74) *Attorney, Agent, or Firm* — Plumsea Law Group, LLC; Mark E. Duell

(57) ABSTRACT

A folding table and support frame assembly is disclosed. The table comprises two planar portions connected by a hinging member. One of the planar portions is coupled to a support frame such that the folded table can be moved into a stowed position within the support frame assembly. The planar portions comprise a proximal portion or inner member and a distal portion or outer member. The proximal portion and distal portion are connected to one another by the hinging member or middle member. The hinging member enables the rotation of the distal portion into a folded relationship upon the proximal portion. When the two planar portions are folded, they provide a smaller table surface in a half-open or partially extended position. When the two planar portions are opened along the hinging member, the planar portions and the hinging member provide a larger contiguous table in the fully extended position.

12 Claims, 15 Drawing Sheets

FOLDING TABLE AND SUPPORT FRAME ASSEMBLY

CROSS REFERENCE TO RELATED APPLICATIONS

This application is a continuation in part of U.S. application Ser. No. 29/295,082, entitled "Folding Table", and filed on Sep. 21, 2007, now U.S. Pat. No. D,575,546 which patent application is hereby incorporated by reference in its entirety.

BACKGROUND OF THE INVENTION

1. Field of the Invention

The present invention relates generally to tables, and more specifically to a folding table and support frame assembly that can be used as a horizontal table surface in multiple positions and further folded to be stowed.

2. Description of Related Art

Stowable table surfaces have been used in a variety of environments including vehicles, living areas, lecture halls, and chairs. For example, stowable tray tables are used on airplanes, desks are equipped with stowable table surfaces, and stowable tables are used on recreational vehicles. They are particularly useful when space is at a minimum. The table can be extended when a table surface is needed and then stowed away when the surface is not needed.

Typical stowable tables have two primary positions, an extended position and a stowed position. In the extended position, there is a fixed position table surface. If the table surface was too small, a user could not enlarge the table surface to obtain a larger work area. If the table surface was too large, a user could not minimize the table surface to conserve space for other activities or to move about.

Some stowable tables have a single piece table surface that can be rotated ninety-degrees in an upward direction from the horizontal position and then slid downwards into its stowed position. Another familiar type of prior art stowable table is the simple vertically stowed table in the coach cabins of passenger aircraft. This type of table has a frame that rotates the table into a horizontal position. The table surface is limited in size by the shape and size of the seat back onto which it is stowed. In some cases, the frame enables the single piece table surface to translate toward and away from the user once it is in the horizontal position. Both of these types of stowable tables provide a single piece table top of limited size. These surfaces may not provide sufficient space for resting and using service items, games, books, computers, and papers. The single piece table top design reduces the table surface area in environments that are not exceptionally tall, such as vehicles because of the manner in which these are stowed. This particular design may also make it difficult for individuals to move the table from the stowed position to an extended position.

Another type of stowable table in the prior art that addresses the need for a larger table surface is the folding two-part table mounted in some lecture hall chairs. In these assemblies, a single post provides support for a folded two-piece table surface. It is stowed on the side of the chair and the folded assembly is rotated upward about the support post. Once the upward rotation is complete the folded table is in a horizontal position cantilevered from the single support post. The two table surfaces are opened like a book about a center hinge, and the combined surfaces provide a larger table surface. A shortcoming of this prior art table is the single post support which provides a less stable base than framed supports. The surface is also limited by the relatively small size of the side of a chair. The structural integrity of the table is limited in weight since the folded and stowed table should not cause any imbalance to an unoccupied chair.

Stowable tables typically also have one or more hinge and cantilever elements that are exposed to the user. Sometimes these features cause the user's fingers, clothes, and other items to snag. This may result in pain and damage to the user and his possessions.

Certain folding tables also were difficult to remove from their stowed position or had crude mechanisms to remove the table from the stowed position. These folding tables lacked handles and used clumsy mechanical linkages.

There is a need in the art for a system and method that addresses the shortcomings of the prior art discussed above. Therefore, there exists a need in the art for a folding table: 1) that can be easily pulled out of a stowed position; 2) where the hinges, sliding, and cantilever mechanisms are at least partially hidden to reduce finger pinch zones; 3) that can be utilized as a work space in the partially extended or "half open" position; and 4) that minimizes the space needed above the table when moving the table into a stowed position.

SUMMARY OF THE INVENTION

A foldable table and support frame assembly is disclosed. The foldable table and support frame assembly is foldable and stowable to both minimize stowage space and maximize table surface. The assembly comprises two planar portions connected by a hinging member that enables the two planar portions to fold upon themselves. One of the planar portions is coupled to a support frame such that the folded table can be moved into a stowed position within the support frame assembly.

In one aspect, the table and frame assembly comprise a table assembly and a frame assembly. The table assembly is comprised of an outer member, a middle member movably connected to the outer member, and an inner member movably connected to the middle member. The frame assembly is movably connected to the inner member and configured to provide support to the table. The table and frame assembly has three positions. In a first position, the table resides within the frame assembly for stowing purposes. In a second position, the inner member and the outer member are positioned between the middle member and the frame assembly to provide a first table surface. In a third position, the middle member and the inner member are positioned between the outer member and the frame assembly to provide a second table surface. The second table surface is larger than the first table surface.

In another aspect, the frame assembly provides support to a table and is movably connected to the table. The table comprises a distal portion, a hinging member movably connected to the distal member by a first rod, and a proximal member movably connected to the hinging member by a second rod and movably connected to the frame assembly. The table and frame assembly adjusts to a stowed position, partially extended position, and a fully extended position. The hinging member enables a foldable relationship between the distal portion and the proximal member to achieve the partially extended position and the fully extended position. The hinging member functions as a handle when moving the table and frame assembly between the stowed position and the partially extended position.

In another aspect, the table and frame assembly are comprised of a support frame and a table. The support frame is configured to provide support to a table and comprises a stationary frame and a movable carrier connecting the stationary frame to the inner member. The table is comprised of a distal member, a hinging member movably connected to the distal member, and a proximal member movably connected to the hinging member. The movable carrier moves through and rotates within the stationary frame to move the table into and out of a stowed position. The movable carrier and the proximal member combine to create a cantilever mechanism to support the table in a partially extended position and a fully extended position.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
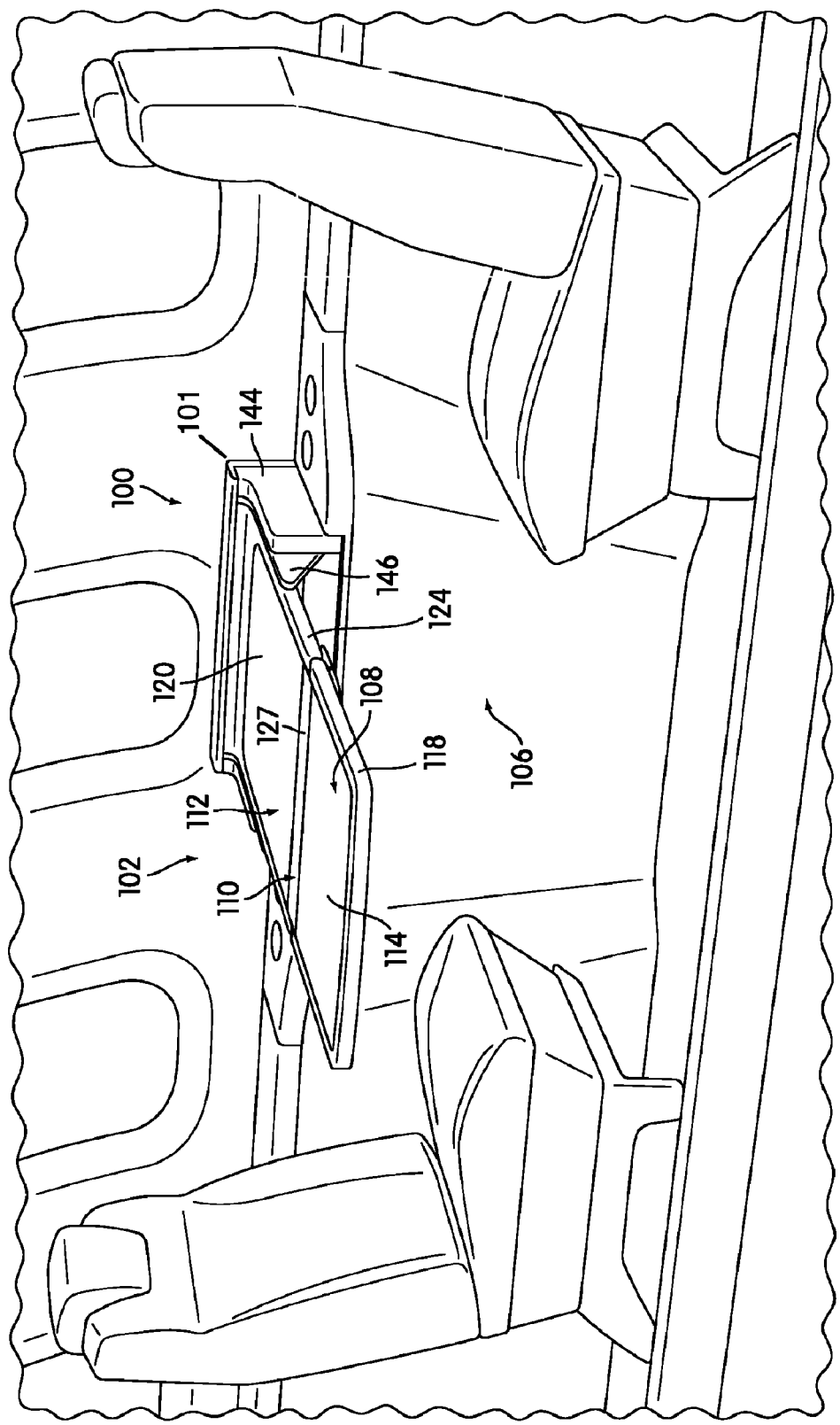
FIG. 1 is a schematic environmental diagram of an embodiment of a folding table assembly in a fully extended position shown in isolation.

Embodiments of the present invention are first described using FIGS. 1-6 that illustrate a folding table and support frame assembly in operation. Then the invention is described using FIGS. 2-15 to illustrate the folding table and support frame assembly in more detail. With respect to FIGS. 1-15, for convenience of description various features may be referred to as the top end, bottom end, top portion, and bottom portion and various directions may be referred to as down or up. These descriptions referring to the orientation of the device as illustrated in the drawings are for convenience and clarity, and should not be interpreted as limiting the scope of the invention in any way. It is understood that directional adjectives will change if the device were viewed from a different orientation than as pictured FIG. 1 is a schematic environmental diagram of a preferred embodiment of a folding table assembly in an extended position. Referring to FIG. 1, folding table assembly 102 is illustrated between two seats within the seating area of an airplane. Folding table assembly 102 may extend from low wall 106 located on one side of the fuselage. Low wall 106 and wall cover 101 serve as a housing for folding table and support frame assembly 100 when folding table and support frame assembly 100 are in a stowed position. A portion of support frame assembly 104 is visible at an upper portion of low wall 106. When an individual is no longer in need of the table surface, folding table assembly 102 may be manually folded by the individual and stowed inside low wall 106. Wall cover 101 may then be lowered to lie flush with and cover the opening in the upper portion of low wall 106.

Some embodiments of folding table and support frame assembly 100 may include installation in environments other than an airplane seating area. For example, folding table and support frame assembly 100 may be installed in another area of an airplane or another type of vehicle. Other types of vehicles may include recreational vehicles (RVs), water vessels, trains, buses, and automobiles. Folding table and support frame assembly 100 may be installed on a seat. A seat may include a couch, lounge chair, and an auditorium chair. The folding table and support frame may be stowed inside an arm or adjacent to the arm of a seat. Folding table and support frame assembly 100 may also be installed within a building such as a house. Within a building, the folding table and support frame assembly 100 may be installed inside a wall or attached to some other feature of the building.

Other embodiments of folding table and support frame assembly 100 may include a structure that is free standing. In such an embodiment, the structure may be portable in that it can be moved to any location and the folding table extended for use.

Folding table and support frame assembly 100 will be described with respect to three main positions: a fully extended position, a partially extended position, and a stowed position. Broadly, the table is foldable and stowable to both minimize stowage space and maximize table surface, and comprises two planar portions connected by a hinging member that enables the two planar portions to fold upon themselves. One of the planar portions is coupled to a support frame such that the folded table can be moved into a stowed position within the support frame assembly. The planar portions will be described with respect to their relationship to the frame, and they comprise a proximal portion or inner member 112, and a distal portion or outer member 108. The proximal portion and distal portion are connected to one another by a hinging member or middle member 110. The hinging member enables the rotation of the distal portion into a folded relationship upon the proximal portion. When the two planar portions are folded, they provide a smaller table surface in a half-open or partially extended position. When the two planar portions are opened along hinging member, they provide a larger contiguous table in the fully open or fully extended position.

In describing the positions of the folding table and support frame assembly 100, the actuation of the folding table and support frame assembly 100 between the three positions will be detailed. In describing the actuation of the folding table and support frame assembly 100 from a fully extended position to a stowed position, the description of support frame assembly 104 will primarily focus on one side of support frame assembly 104 because the action occurring on one side is similar to the action on the other side of support frame assembly 104.

Figure 2:
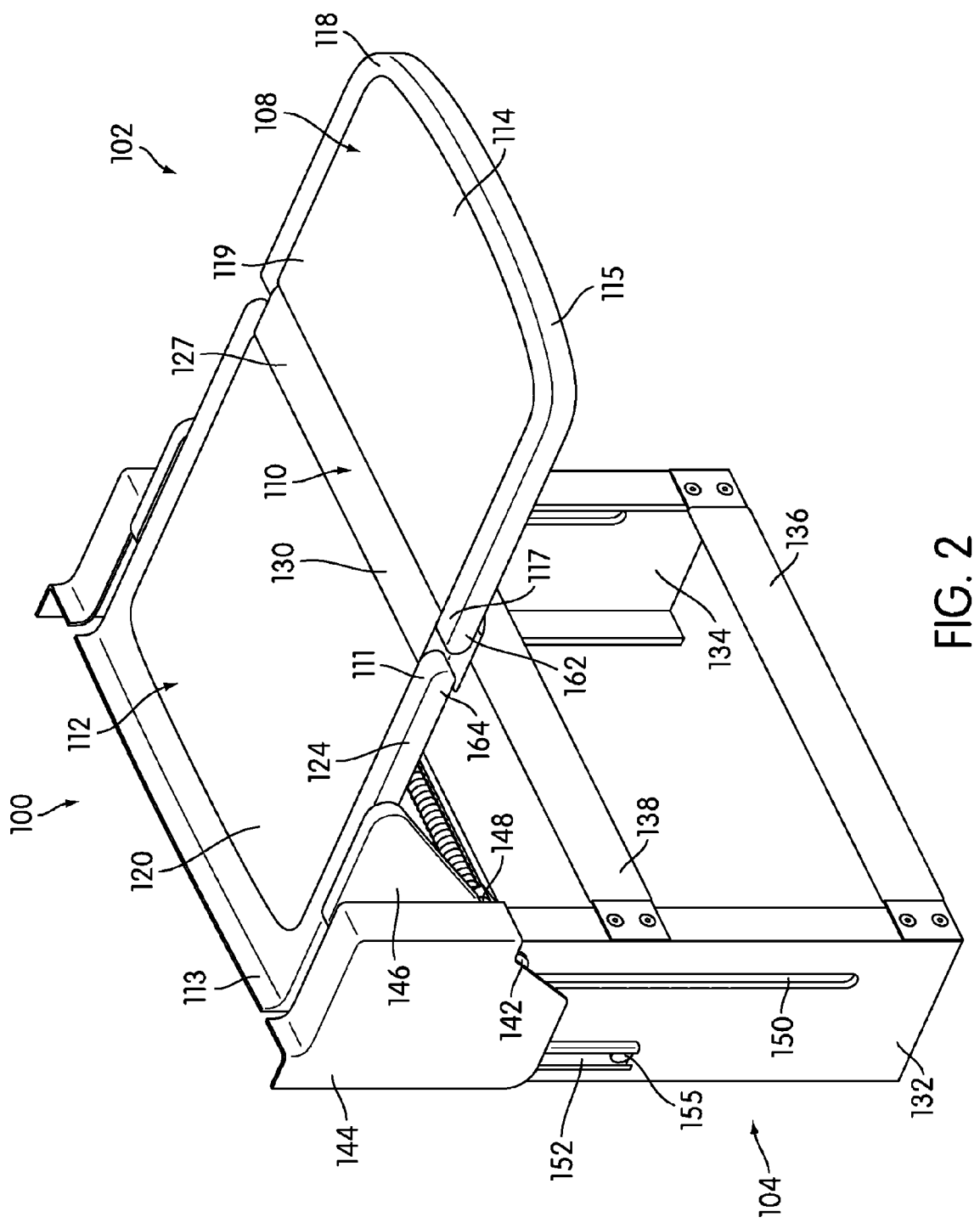
FIG. 2 is a schematic diagram of the folding table and support frame assembly in a fully extended position.

FIG. 2 is a schematic diagram of the folding table and support frame assembly in a fully extended position. Referring to FIG. 2, folding table and support frame assembly 100 may include folding table assembly 102 and support frame assembly 104. Folding table assembly 102 may include an outer member 108, middle member 110, and inner member 112. Outer member 108 may be connected to middle member 110 at outer member hinge area 162. Middle member 110 is connected to inner member 112 at inner member hinge area 164.

Support frame assembly 104 may provide support for table assembly 102 when table assembly 102 is in any of the three main positions. The features of support frame assembly 104 may maintain the table in an upright position, may allow table assembly 102 to be moved from a partially extended position to a stowed position, and may provide at least a portion of the cantilever mechanism to maintain table assembly 102 in a partially extended position and a fully extended position. Only a few of the features associated with support frame assembly 104 are visible in FIG. 2. These features will be illustrated and described in detail later.

Folding table and support frame assembly 100 may include various covers and panels that provide a table surface for a user and protect a user from harming himself. Outer member 108 may include panels covering the exterior of outer member 108. FIG. 2 shows outer member first side panel 114 and outer member edge panel 118. The underside of outer member 108 may also include an outer member second side panel similar to that of first side panel 114. Similarly, inner member 112 may include inner member first side panel 122 and inner member edge panel 124 covering the exterior of inner member 112. The underside of inner member 112 may also include an inner member second side panel similar to inner member first side panel 122. The panels associated with outer member 108 and inner member 112 and middle member table surface 127 combine to provide the table surface of table assembly 102.

Some panels and covers may also protect a user from harming himself. For example, outer member edge panel 118 and inner member edge panel 124 may cover and hide hinge elements associated with outer member 108, middle member 110, and outer member 112. Connecting plate 148 may also be hidden by connecting plate cover 146. Finally, support frame cover 144 may provide coverage across an upper portion of support frame assembly 104.

Additionally, when folding table and support frame assembly 100 is installed and extended, an additional cover may extend across the rear and upper portions of assembly 100 to meet support frame cover 144 and inner member free end 113. This support frame cover may be configured similarly to wall cover 101 shown in FIG. 1. The additional cover provides added protection for users by further enclosing the mechanical elements associated with support frame assembly 104.

The operation of the table will now be described with reference to FIGS. 3-6. In order to move folding table assembly 102 from a fully extended position to a partially extended position, an individual may first push or pull outer member free end 115 so that outer member 108 moves upward from a horizontal position to a vertical position substantially above middle member 110.

Figure 3:
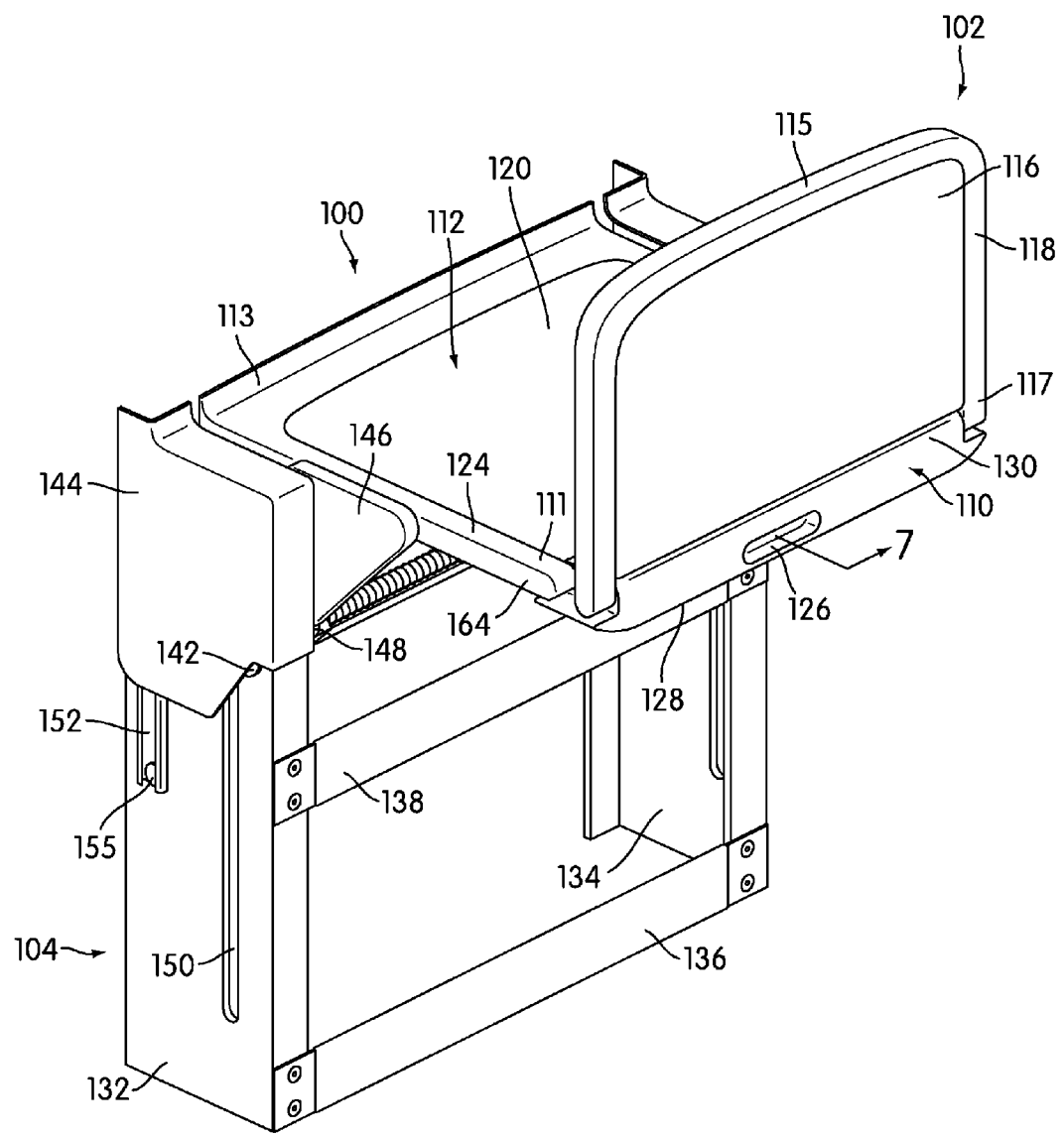
FIG. 3 is a schematic diagram of the folding table and support frame assembly of FIG. 2 between a fully extended position and partially extended position.

FIG. 3 is a schematic diagram of the folding table and support frame assembly of FIG. 2 between a fully extended position and partially extended position. Referring to FIG. 3, outer member 108 lies in a vertical position substantially above middle member 110. In order to achieve this position, outer member first side panel 114 and outer member second side panel 116 are designed shorter than outer member edge panel 118. Additionally, middle member secured end 130 is located between outer member secured ends 117 and 119.

Figure 4:
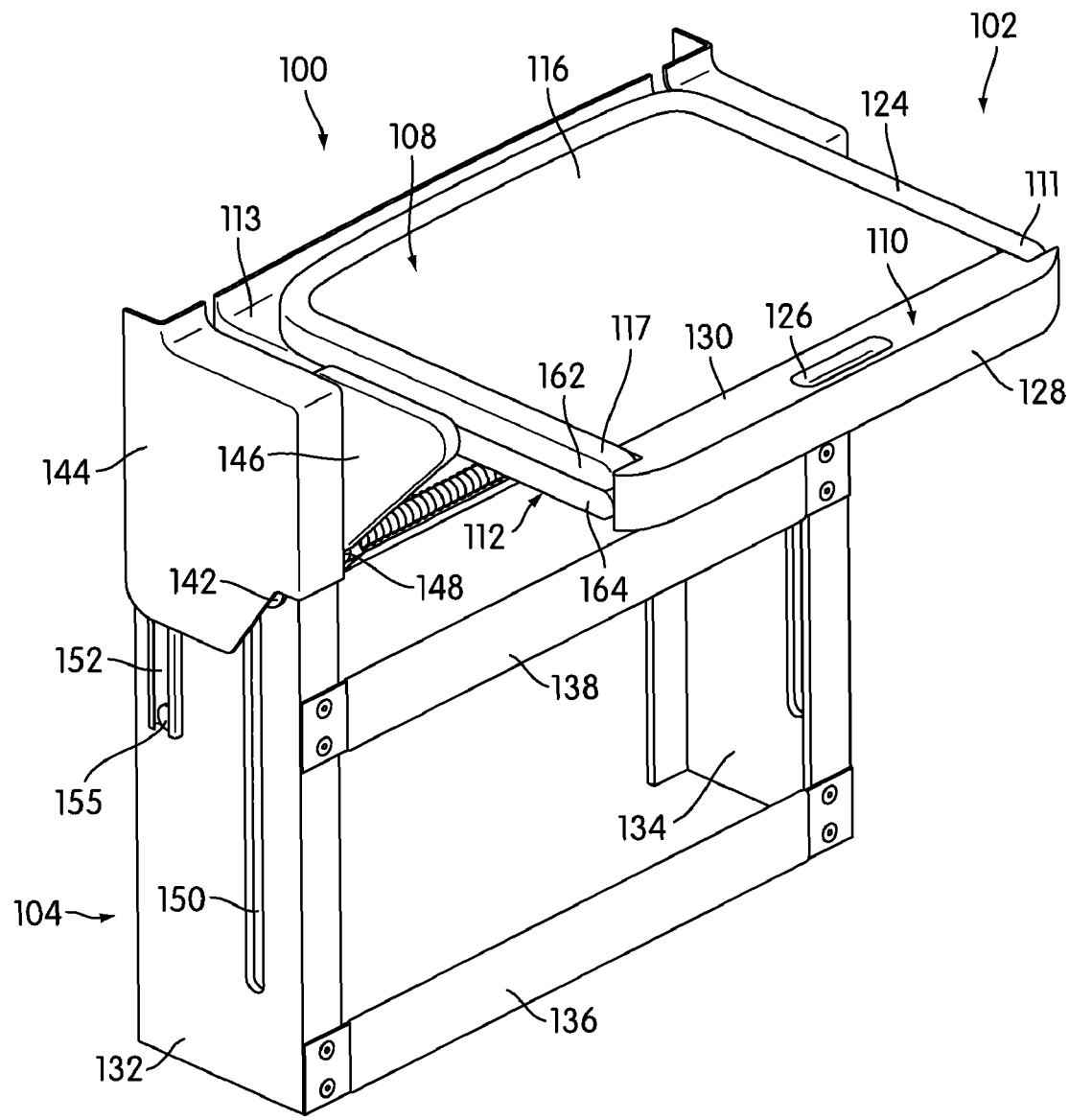
FIG. 4 is a schematic diagram of the folding table and support frame assembly of FIG. 2 in a partially extended position.

To achieve a partially extended position, an individual may then push outer member free end 115 so that outer member 108 moves downward from a vertical position substantially above middle member 110 to a horizontal position resting above inner member 112. FIG. 4 is a schematic diagram of the folding table and support frame assembly of FIG. 2 in a partially extended position. Referring to FIG. 4, outer member 108 lies in a horizontal position above inner member 112. In this position, outer member first side panel 114 and inner member first side panel 120 are in contact.

When outer member 108 moves from the vertical position in FIG. 3 to the horizontal position in FIG. 4, middle member 110 moves in concert. As a result, middle member 110 also moves from a vertical position to a horizontal position. In other words, middle member 110 moves approximately 90 degrees. In this horizontal position, middle member recess 126 and middle member free end 128 are now visible from above folding table assembly 102. Middle member secured end 130 continues to be visible. However, middle member table surface 127, which is a side of middle member secured end 130, is now hidden by outer member 108 and inner member 112.

The partially extended position may be useful in that if a larger table surface is not needed by a user, a smaller table surface can be utilized so that more space may be available for other activities or needs.

In moving from a fully extended position to the partially extended position no movement has been required of support frame assembly 104. To this point, support frame assembly 104 has been supporting the folding table assembly 102 in a cantilevered manner.

Middle member 110 may be used as both a handle and hinge element. The hinge function of middle member 110 allows the table to be folded from a fully extended position to a partially extended position. In the partially extended position, middle member recess 126 and middle member free end 128 are visible. Middle member recess 126 and middle member free end 128 may be used as a handle when moving the folding tray and support frame assembly 100 from the partially extended position to the stowed position. Middle member 110 also provides support to table assembly 102 as a cantilever mechanism for outer member 108 when table assembly 102 is in a fully extended position. In other words, middle member 110 prevents outer member 108 from rotating below a horizontal position.

Figure 5:
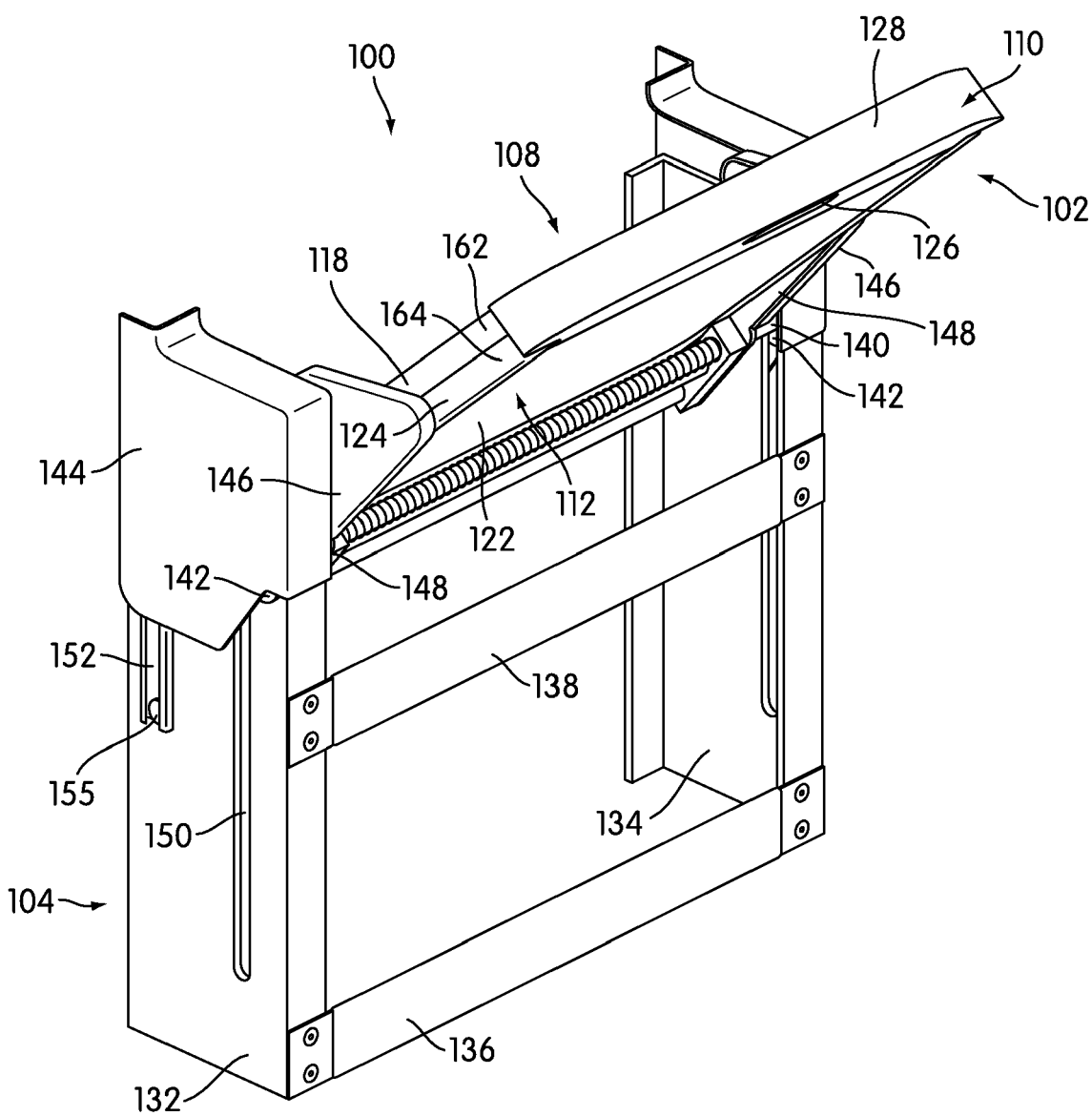
FIG. 5 is a schematic diagram of the folding table and support frame assembly of FIG. 2 between a fully extended position and a stowed position.
Figure 6:
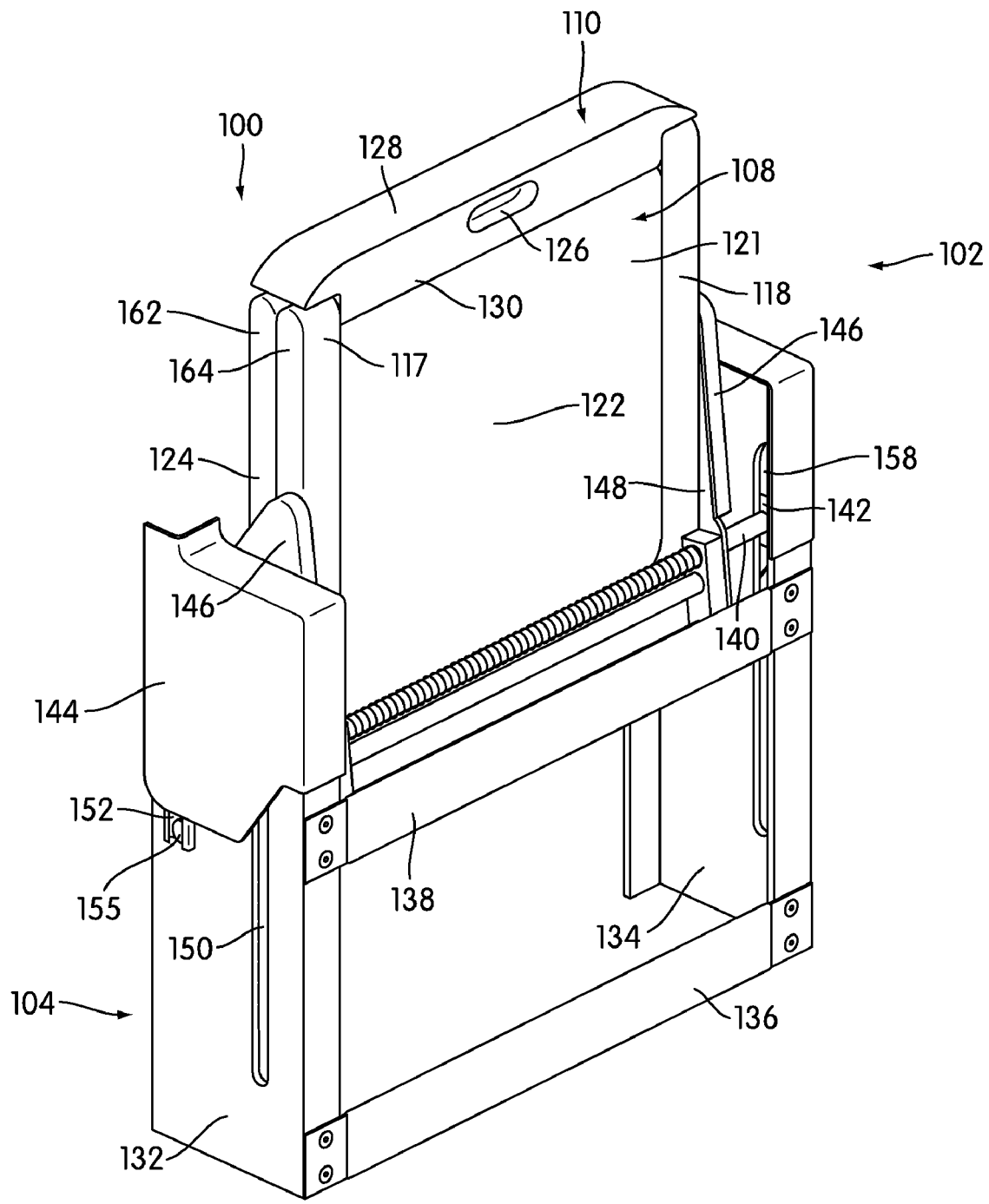
FIG. 6 is a schematic diagram of the folding table and support frame assembly of FIG. 2 between a fully extended position and a stowed position.

In order to move folding table assembly 102 from the partially extended position to the stowed position, an individual first may push or pull middle member 110 so that middle member 110 moves upward and inner member free end 113 moves downwards. This movement causes table assembly 102 to move from a horizontal position towards a vertical position near and above the top end of support frame assembly 104. FIG. 5 is a schematic diagram of the folding table and support frame assembly of FIG. 2 between a fully extended position and a stowed position. FIG. 6 is a schematic diagram of the folding table and support frame assembly of FIG. 2 between a fully extended position and a stowed position. Referring to FIG. 5, as middle member 110 initially moves upward and inner member free end 113 initially moves downward, support frame assembly 104 continues to remain stationary. FIG. 5 shows table assembly 104 having moved approximately 45 degrees. After table assembly 104 moves approximately 45 degrees, table assembly 104 and a portion of support frame assembly 104, including connecting plate cover 146, begin to move in concert. To this point, the movement of table assembly 102 and the moving portion of support frame assembly 104 have been primarily rotational.

As folding table and support frame assembly 100 continue to more toward the stowed position, the movement of table assembly 102 may become more complex. As middle member 110 continues to move upward and inner member free end 113 continues to move downward, a portion of support frame assembly 102 moves in concert. Essentially, table assembly 102 moves toward a substantially vertical position as opposed to the fully extended position, wherein table assembly 102 was essentially in a substantially horizontal position. Simultaneously, table assembly 102 and portions of support frame assembly 104 begin to move toward folding table and support frame assembly rear portion 103 and then downward toward lower support bar 136. Referring to FIG. 6, when table assembly 102 reaches a substantially vertical position, table assembly 102 has moved rearward and downward. The movement may be best illustrated in FIGS. 5 and 6 by comparing the position of rod 142 in FIG. 5 to the position of rod 142 in FIG. 6.

In moving from a partially extended position to a stowed position, the rotational and rearward movement of table assembly 102 may eventually cease, and the movement of table assembly 102 may become purely linear. At this point, table assembly 102 continues to translate toward lower support bar 136. Eventually, table assembly 102 may rest in the stowed position.

Figure 7:
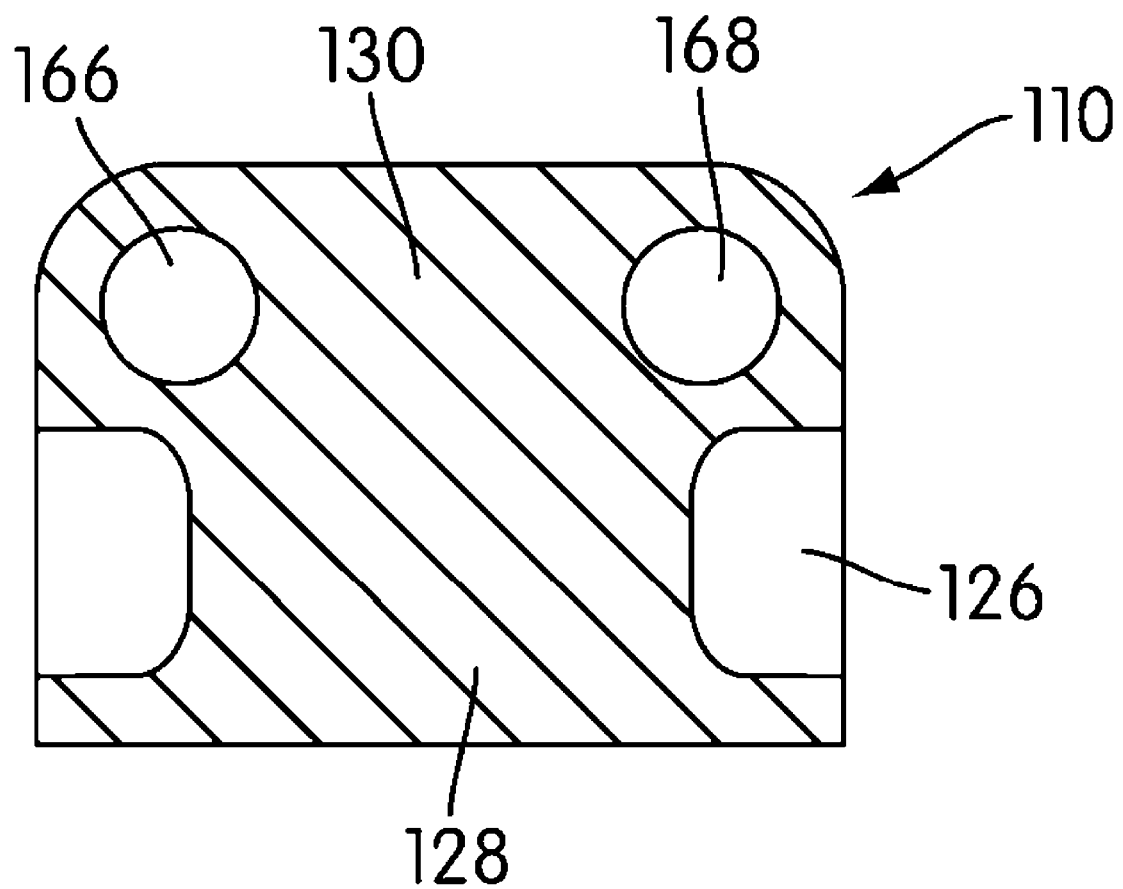
FIG. 7 is a schematic cross-sectional view of an embodiment of a middle member shown in FIG. 3.

Next, the details of folding table and support frame assembly 100 will be discussed. FIG. 7 is a schematic cross-sectional view of an embodiment of a middle member shown in FIG. 3. Referring to FIG. 7, middle member 110 includes middle member free end 128 and middle member secured end 130. Middle member free end 128 functions as a handle when moving table assembly 102 into various positions. Middle member free end 128 includes middle member recess 126 that can be used to grasp and move middle member 110.

Middle member secured end 127 functions as a hinge when moving table assembly 102 between a fully extended position and a partially extended position. Middle member secured end 127 includes a first passage 166 and a second passage 168. First passage 166 is utilized as part of a hinging mechanism for middle member 110 and inner member 112. Similarly, second passage 168 is utilized as part of a hinging mechanism for middle member 110 and outer member 108.

Figure 8:
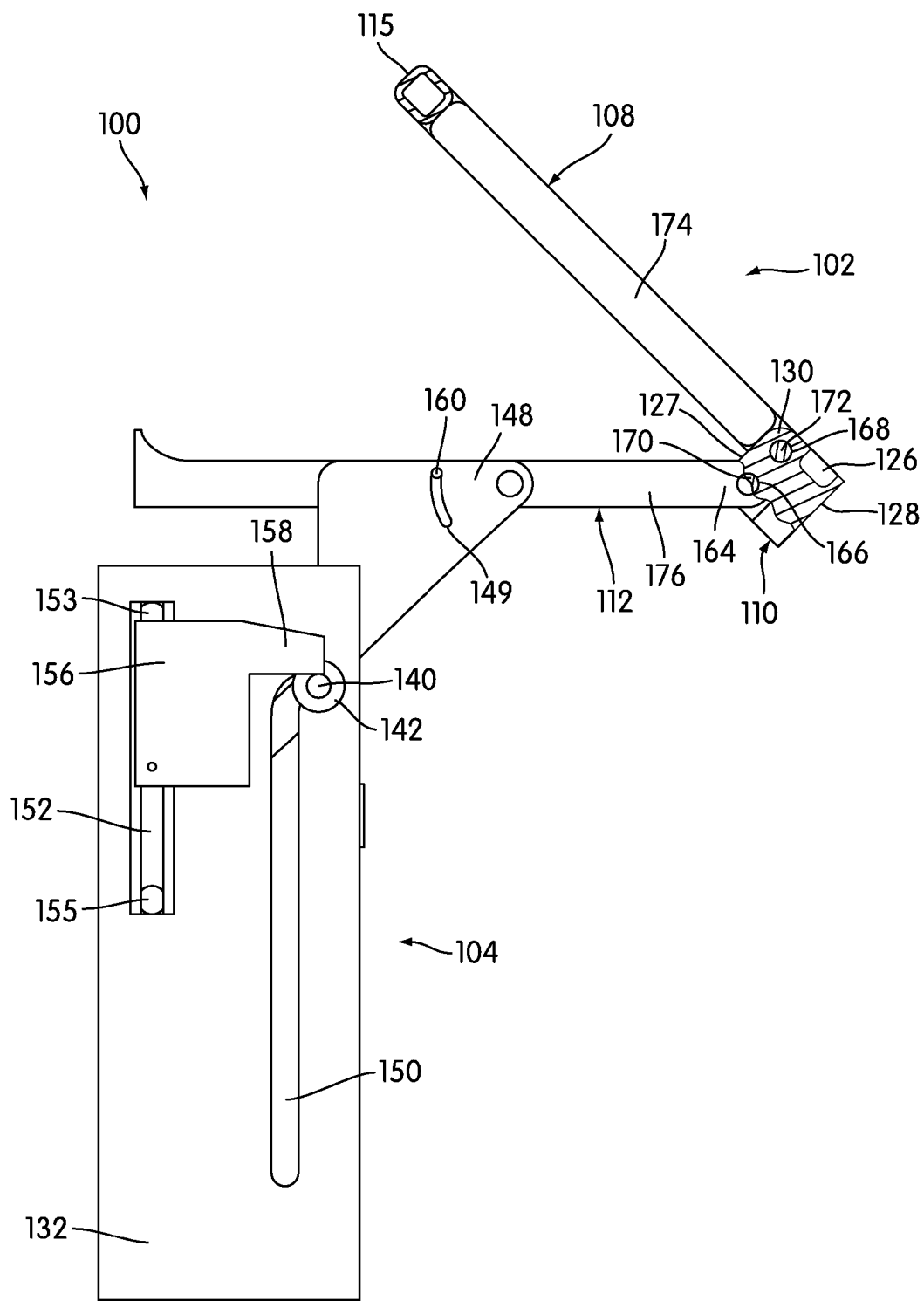
FIG. 8 is a schematic diagram of a side view of the folding table and support frame assembly of FIG. 2 between a fully extended position and a partially extended position with covers and panels removed.

FIG. 8 is a schematic diagram of a side view of the folding table and support frame assembly of FIG. 2 between a fully extended position and a partially extended position with covers and panels removed. Referring to FIG. 8, table assembly 102 is composed of a frame structure when exterior panels 114, 116, 118, 120, 122, and 124 are removed. Outer member 108 is composed of outer member frame 174. Outer member frame 174 may be hollow as illustrated in FIG. 8. Similarly, inner member 112 is composed of inner member frame 176 that may be hollow.

The hinging mechanism between middle member 110 and inner member 112 may be referred to as inner member hinge 164. Inner member hinge 164 is composed of middle member secured end 130 having a first passage 166 and inner member frame 176 having inner member frame passages 177 on either end of inner member frame 176. Inner member hinge 174 may also includes first rod 170 that resides within first passage 166 and inner member frame passages 177.

The hinging mechanism between middle member 110 and outer member 108 may be referred to as outer member hinge 162. Similar to inner member hinge 164, outer member hinge 162 may be composed of middle member secured end 130 having a second passage 168, outer member frame 174 having outer member frame passages 175 on either end of inner member frame 176, and a second rod 172 residing within second passage 168 and outer member frame passages 175.

In an embodiment, when table assembly 102 is moved from a fully extended position to a partially extended position, outer member 108 may be moved first thereby actuating outer member hinge 162. Generally, when outer member 108 reaches and passes a vertical position, inner member hinge 164 may be actuated. Outer member hinge 162 and inner member hinge may cease to operate once table assembly 102 reaches a partially extended position.

Similarly, when table assembly 102 is moved from partially extended position to a fully extended position, outer member 108 is moved first thereby actuating outer member hinge 162. Generally, when outer member 108 reaches and passes a vertical position, inner member hinge 164 may be actuated. Outer member hinge 162 and inner member hinge may cease to operate once table assembly 102 reaches a fully extended position.

Inner member hinge 164 and outer member hinge 162 allow table assembly 102 to move between a partially extended position and a fully extended position. However, in moving from a partially extended position to a stowed position other hinge mechanisms are utilized. Several hinge mechanisms may be associated with movable carrier 139.

Figure 9:
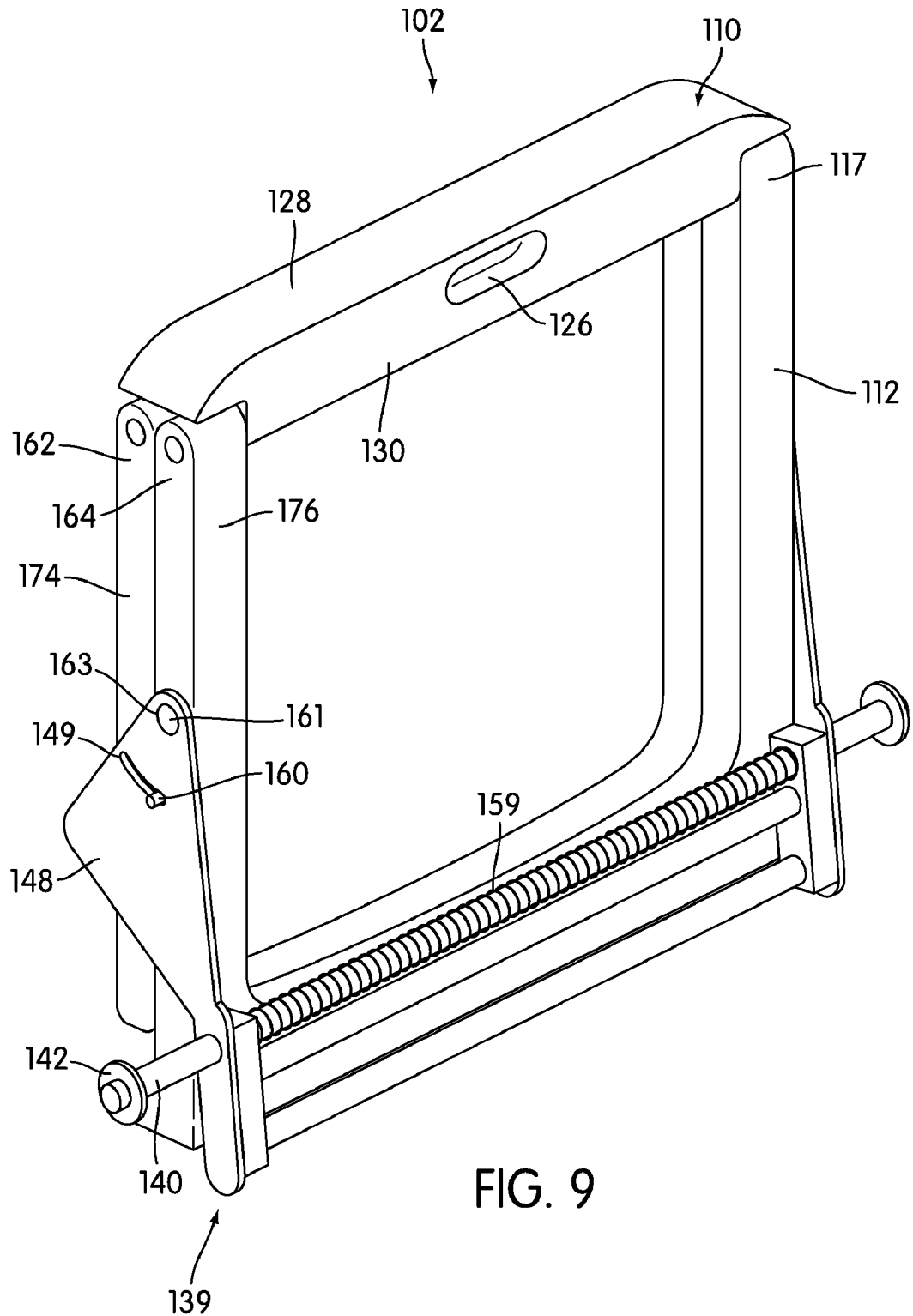
FIG. 9 is a schematic diagram of the folding table and a movable carrier of a support frame shown in isolation.

In moving approximately 45 degrees from a partially extended position that is a substantially horizontal position, the movement of table assembly 102 may be guided through the use of a hinge element. FIG. 9 is a schematic diagram of the folding table and a movable carrier of a support frame shown in isolation. Referring to FIG. 9, movable carrier 139 includes connecting plate 148, movable rod 140, cap 142, and torsion spring 159. Other features of movable carrier 139 shown in FIG. 9 may generally assist in connecting different features together and providing a smoother movement between a stowed position and a partially extended position.

Connecting plate 148 connects table assembly 102 to movable carrier 139 and the remainder of support frame assembly 104. Connecting plate 148 also limits the movement of table assembly 102 as it moves from a partially extended position to approximately 45 degrees from the partially extended position. The primarily rotational movement may be guided by connecting plate hinge element 161 that movably resides in connecting plate aperture 163 and extends into and is attached to table assembly 102. To limit the movement of table assembly 102 to approximately 45 degrees, connecting plate 148 may include cantilever slot 149. Cantilever bar 160 may protrude from table assembly 102 and may protrude through cantilever slot 149.

In the exemplary embodiment shown in the figure, cantilever slot 149 may be as thick as connecting plate 148. In another embodiment, cantilever slot 149 may be shallow and only visible from the side of connecting plate 148 that faces table assembly 102. In other words, cantilever slot 149 may be thinner than connecting plate 148. In this embodiment, cantilever bar 160 may also be shorter to accommodate the more shallow cantilever slot 149.

Figure 10:
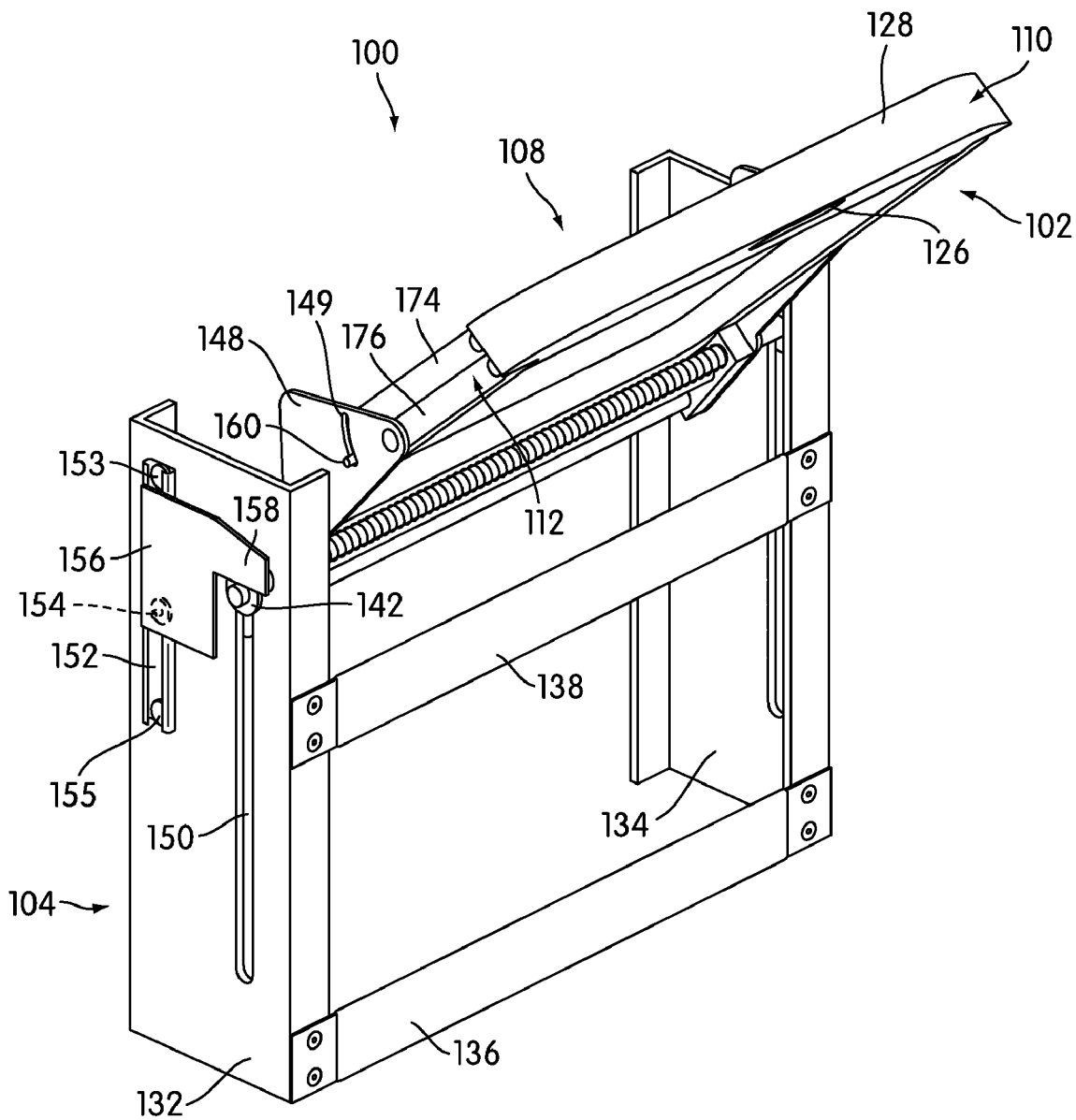
FIG. 10 is a schematic diagram of the folding table and support frame assembly of FIG. 2 between a partially extended position and a stowed position with covers and panels removed.

FIG. 10 is a schematic diagram of the folding table and support frame assembly of FIG. 2 between a partially extended position and a stowed position with covers and panels removed. Referring to FIG. 10, when table assembly 102 is in a partially extended position, cantilever bar 160 rests near cantilever slot first end 155. When table assembly 102 is moved from a partially extended position to approximately 45 degrees from the partially extended position, cantilever bar 160 moves through cantilever slot 149 to cantilever slot second end 157.

Referring to FIGS. 9-10, torsion spring 159 may be provided on movable rod 140. Torsion spring 159 may provide resistance to movable carrier 139 as it moves forward when moving from a stowed position to a partially extended position. Torsion spring 159 may prevent movable carrier 139 from moving more than 45 degrees as it rotates forward. In an exemplary embodiment, FIG. 10 shows movable carrier 139 at its most forward position. It may be desirable for torsion spring 159 to be configured to provide a degree of dampening to the stowing operation so that the weight of the folded table does not move suddenly.

Main carrier 139 and specifically movable rod 140 extends past the width of table assembly 102 to provide support when table assembly 102 is stationary and mobile. Movable rod 140 moves through movable rod slot 150 when table assembly 102 moves between a partially extended position and a stowed position. Movable rod slot 150 is primarily straight. However, movable rod slot 150 is curved near the upper portion of movable rod slot 150 to move table assembly 102 forward when placing it in an extended position. Accordingly, when table assembly 102 is moved into a stowed position, table assembly 102 is moved toward table and support assembly rear portion 103.

Movable rod 140 includes movable rod cap 142 to prevent movable rod 140 from becoming disconnected from movable rod slot 150 when folding table and support frame assembly is assembled and in operation. Movable rod cap 142 may cover the end of movable rod 140. In an exemplary embodiment shown in the figures, the end of movable rod 140 protrudes through movable rod cap 142. Movable rod 140 and cap 142 are used to move frame cover guide 156 and support frame cover 144 when table assembly 102 is moving from a stowed position to an extended position. Movable rod 140 and cap 142 are also used to support frame cover guide 156 and frame cover 144 when table assembly 102 is in an extended position.

As previously mentioned, support frame cover 144 is used to prevent users from harming themselves on portions of support frame assembly 104. Support frame cover 144 is attached to support frame cover guide 156. Referring to FIG. 10, support frame cover guide 156 includes support frame cover track head 154. Support frame cover track head 154 is movably connected to support frame cover track 152. Support frame cover track 152 includes track first stop 153 and track second stop 155.

Figure 11:
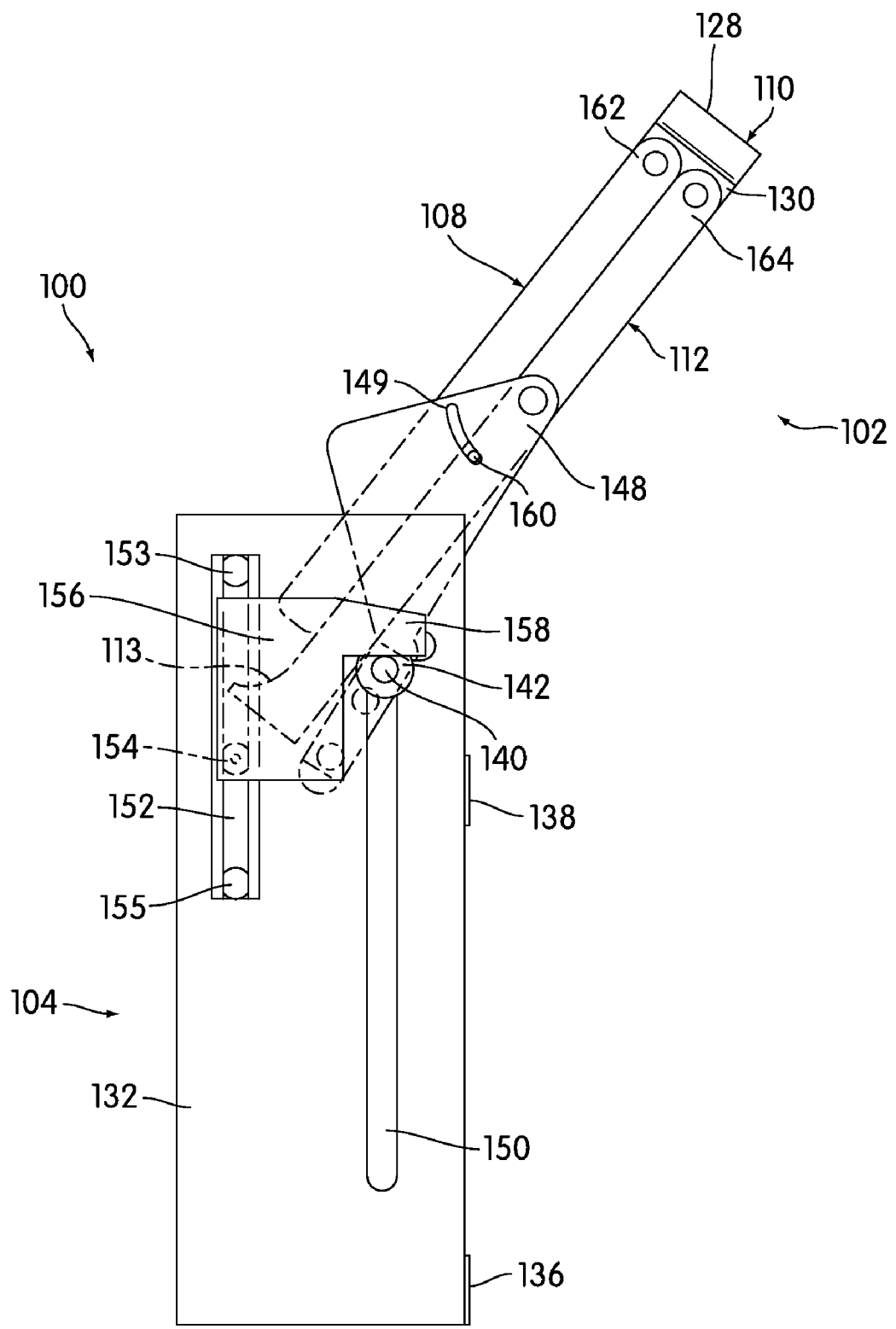
FIG. 11 is a schematic side view of the folding table and support frame assembly of FIG. 10 between a partially extended position and a stowed position.
Figure 12:
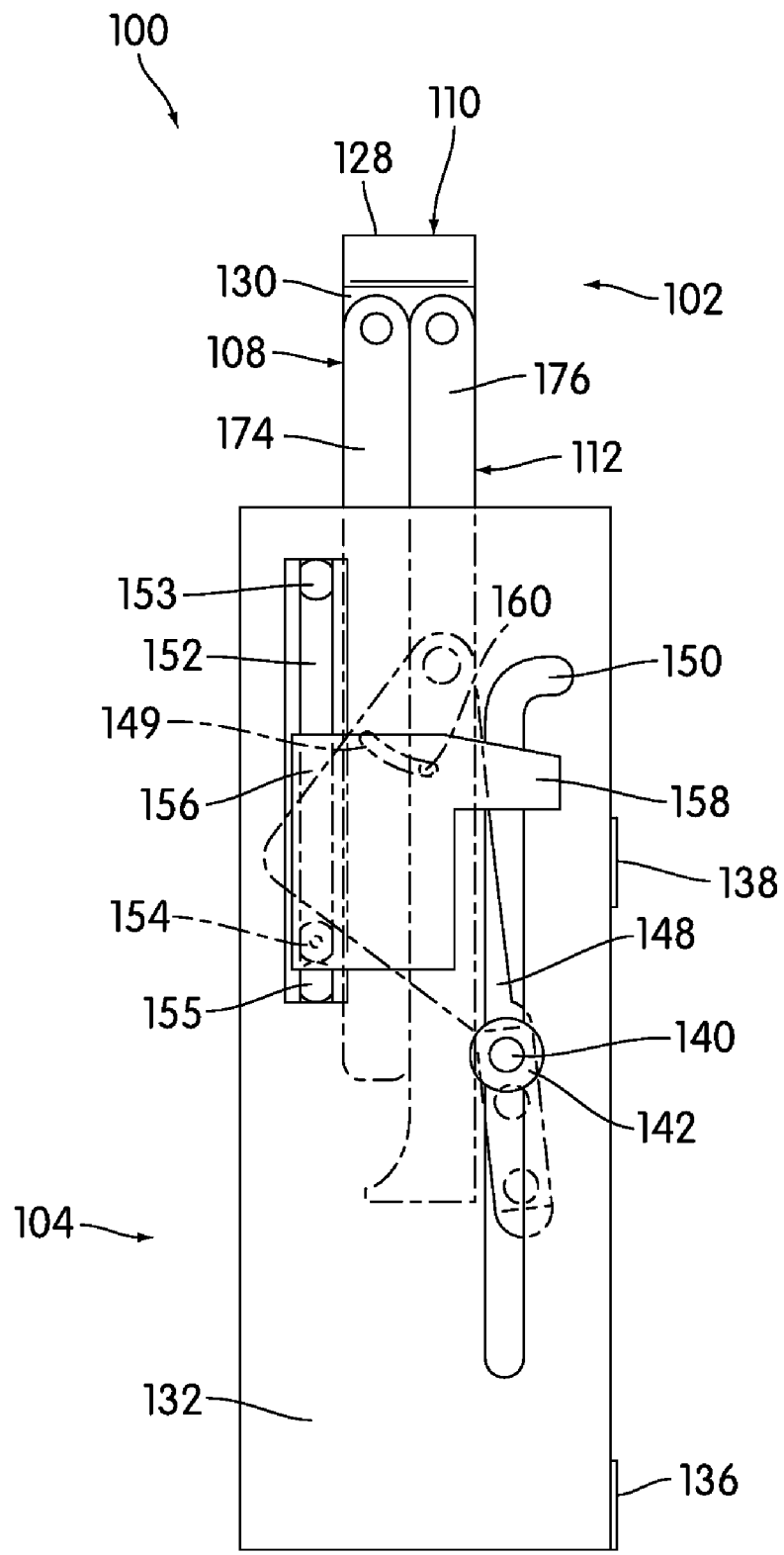
FIG. 12 is a schematic side view of the folding table and support frame assembly of FIG. 10 between a partially extended position and a stowed position.
Figure 13:
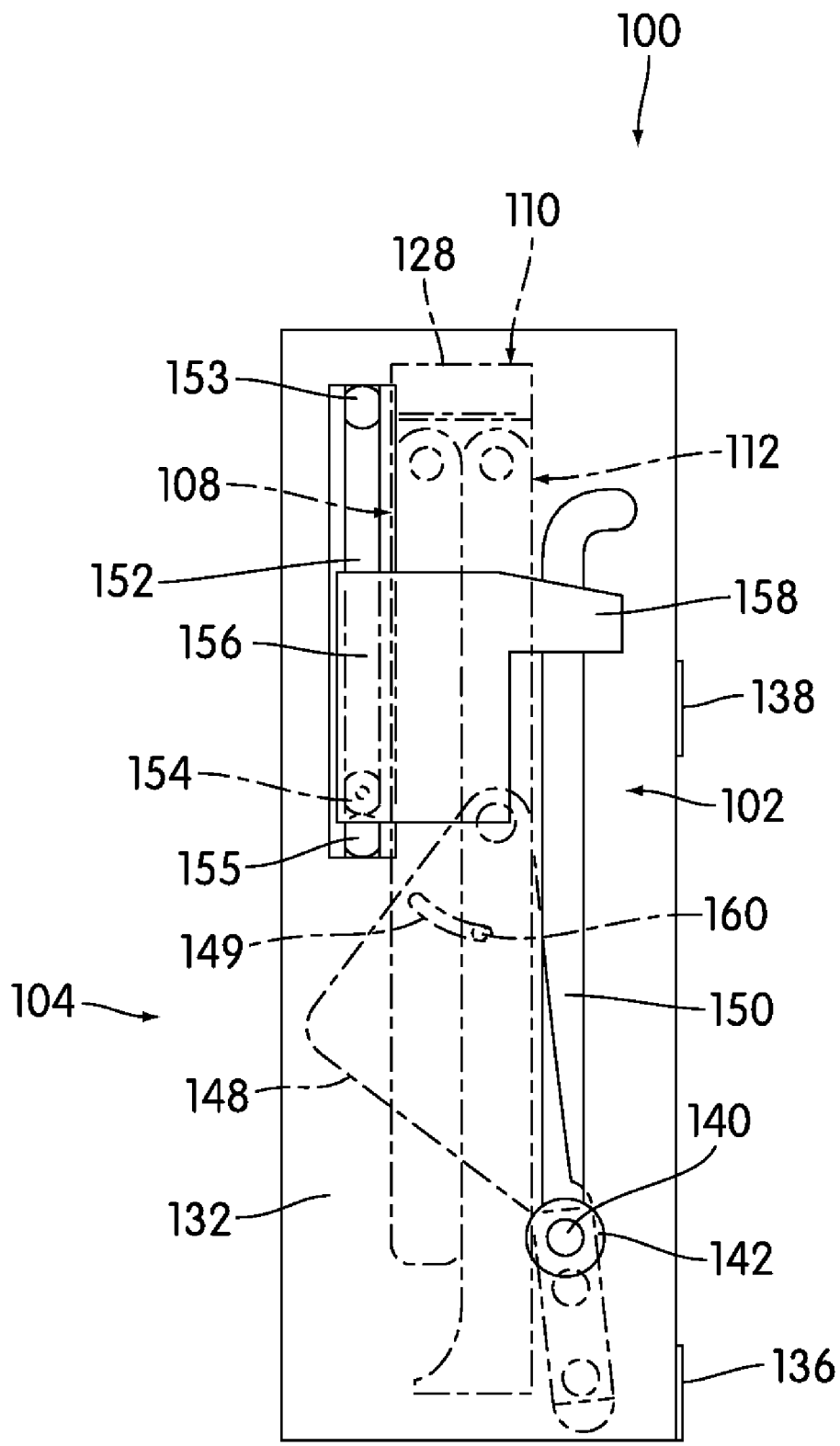
FIG. 13 is a schematic side view of the folding table and support frame assembly of FIG. 10 in a stowed position.
Figure 14:
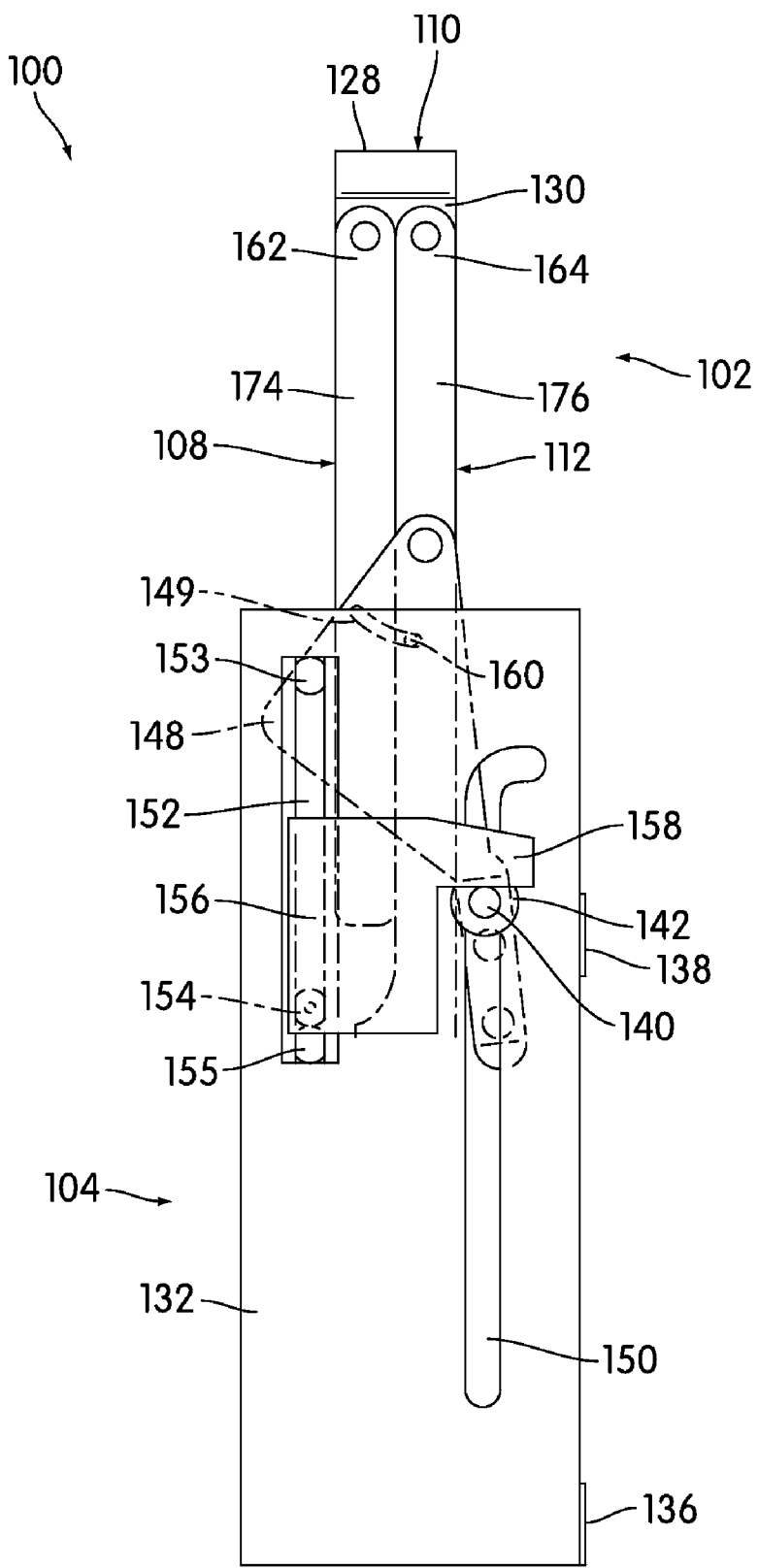
FIG. 14 is a schematic side view of the folding table and support frame assembly of FIG. 10 between the stowed position and a partially extended position.
Figure 15:
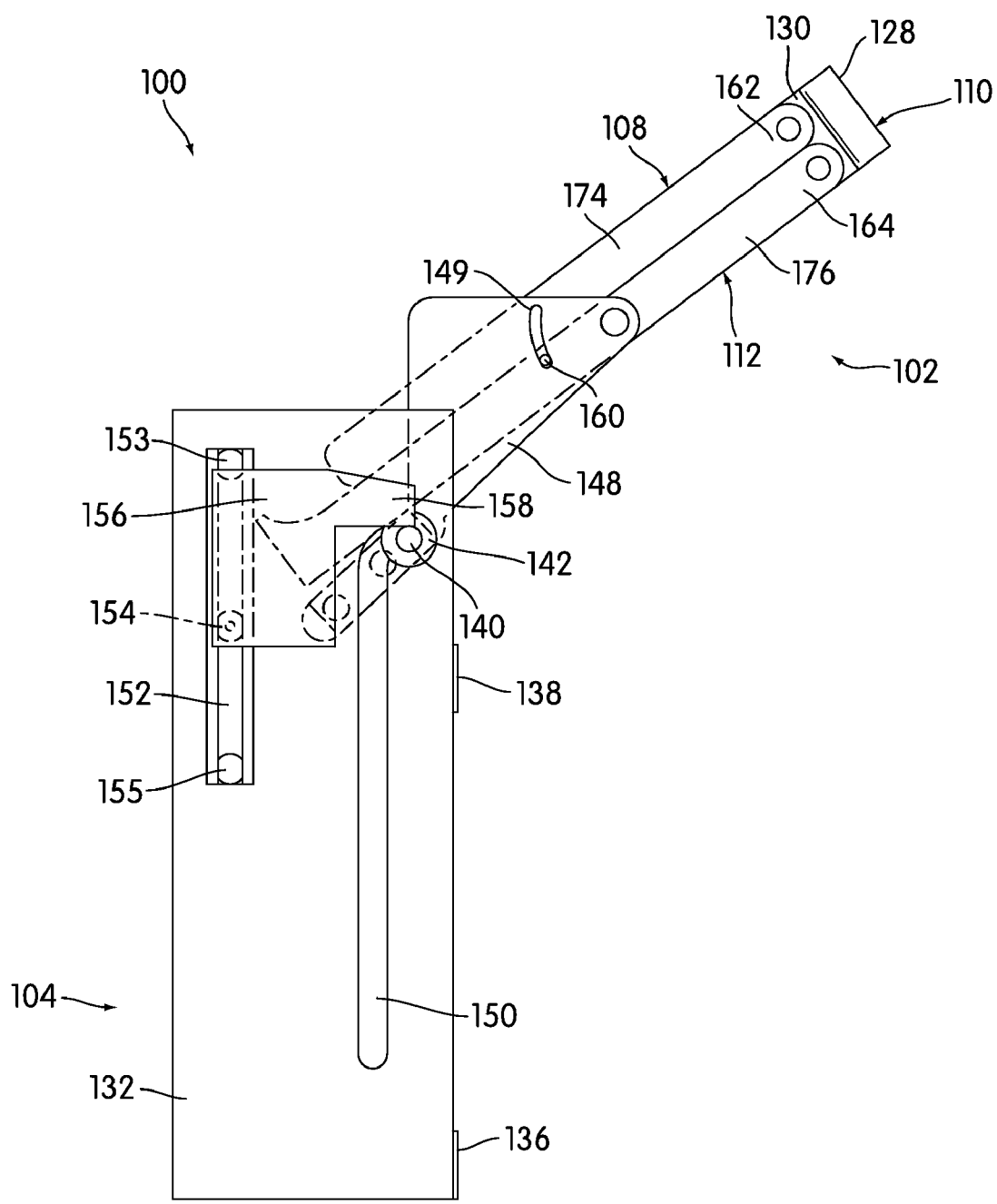
FIG. 15 is a schematic side view of the folding table and support frame assembly of FIG. 10 between the stowed position and a partially extended position.

FIGS. 11-15 further illustrate the movement of folding table and support frame assembly 100 between the partially extended and stowed positions and at the stowed position. FIG. 11 is a schematic side view of the folding table and support frame assembly of FIG. 10 between a partially extended position and a stowed position. FIG. 12 is a schematic side view of the folding table and support frame assembly of FIG. 10 between a partially extended position and a stowed position. FIG. 13 is a schematic side view of the folding table and support frame assembly of FIG. 10 in a stowed position. FIG. 14 is a schematic side view of the folding table and support frame assembly of FIG. 10 between the stowed position and a partially extended position. FIG. 15 is a schematic side view of the folding table and support frame assembly of FIG. 10 between the stowed position and a partially extended position. Referring to FIGS. 11-15, in operation, when table assembly 102 is in a stowed position, support frame cover track head 154 rests against track second stop 155. When table assembly 102 is moving toward an extended position, support frame cover track head 154 travels upward along cover track 152. Depending on the lengths or vertical positions of cover track 152, cover track head 154, and movable rod slot 150, cover track head 154 may reach track first stop 153 or stop well before first stop 153. In an exemplary embodiment shown in FIG. 15, cover track head 154 is at its highest position before reaching first stop 153. In another embodiment, multiple cover track heads may be used to guide the motion of support frame cover guide 156.

Frame cover guide 156 may be driven upwards by movable rod 140 and cap 142, when table assembly 102 is moving from a stowed position to an extended position. However, frame cover guide 156 moves downward due to its weight. In other words, when table assembly 102 is moving toward a stowed position and movable rod cap 142 moves downward, movable rod 140 and cap 142 no longer maintain frame cover guide 156 in an upward position and frame cover guide 156 falls due to its weight.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A table and frame assembly comprising:
a frame assembly providing support to a table and movably connected to said table;
said table movable between a stowed position, a partially extended position, and a fully extended position and comprising:
a distal member;
a hinging member movably connected to said distal member by a first rod;
a proximal member movably connected to said hinging member by a second rod and movably connected to said frame assembly;
a handle provided on said hinging member for facilitating movement of the table and frame assembly between said stowed position and said partially extended position; and wherein said hinging member enables a foldable relationship between said distal portion and said proximal member to achieve said partially extended position, in which said distal member and said proximal member overlap one another, and said fully extended position, in which said distal member defines a free end of said table and is co-planar with said proximal member.

2. A table and frame assembly according to claim 1,
wherein said distal member comprises:
   a first frame; and
   at least one distal member panel attached to and covering said first frame;
wherein said proximal member comprises:
   a second frame; and
   at least one proximal section panel attached to and covering said second frame.

3. A table and frame assembly according to claim 2,
wherein a first portion of said hinging member is positioned between ends of said first frame; and
wherein a second portion of said hinging member is positioned between ends of said second frame.

4. A table and frame assembly according to claim 3, wherein a first passage in said hinging member and said ends of said first frame receive the first rod, and wherein a second passage in said hinging member and said ends of second frame receive the second rod.

5. A table and frame assembly comprising:
a support frame configured to provide support to a table and comprising:
   a stationary frame; and
   a movable carrier connecting said stationary frame to said table;
said table comprising:
   a distal member;
   a hinging member movably connected to said distal member;
   a proximal member movably connected to said hinging member and said movable carrier;
wherein said movable carrier moves through and rotates within said stationary frame to move said table into and out of a stowed position; and
wherein said movable carrier and said proximal member combine to create a cantilever mechanism to support said table in a partially extended position, in which said distal member and said proximal member overlap one another, and a fully extended position, in which said distal member defines a free end of said table and is co-planar with said proximal member.

6. The table and frame assembly according to claim 5, wherein said movable carrier comprises at least one rod, wherein said stationary frame comprises a first slot, and wherein said at least one rod travels through said first slot to move the movable carrier into and out of the stowed position.

7. The table and frame assembly according to claim 6, wherein said first slot is comprised of a straight portion and a curved portion.

8. The table and frame assembly according to claim 7, wherein said movable carrier rotates said table when moving said table between said stowed position and said partially extended position.

9. The table and frame assembly according to claim 8, wherein said movable carrier comprises a torsion spring.

10. The table and frame assembly according to claim 9, wherein a cantilever mechanism is used to hold said table in said partially extended position and said fully extended position and comprises:
   a second slot positioned on said movable carrier;
   a pin positioned on said proximal member; and
   wherein said pin moves along said second slot when said table moves between said stowed position and said partially extended position.

11. The table and frame assembly according to claim 8,
wherein said partially extended position provides a first table surface;
wherein said fully extended position provides a second table surface; and
wherein said second table surface is larger than said first table surface.

12. The table and frame assembly according to claim 6,
wherein a first rod movably connects said middle member to said outer member; and;
wherein a second rod movably connects said middle member to said inner member.

* * * * *